US012646872B2

(12) United States Patent
Song

(10) Patent No.: US 12,646,872 B2
(45) Date of Patent: Jun. 2, 2026

(54) ELECTRICAL MEMBER CONTACT DEVICE AND ANTENNA MODULE COMPRISING SAME

(71) Applicant: AMOTECH CO., LTD., Incheon (KR)

(72) Inventor: Hyeonseob Song, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 196 days.

(21) Appl. No.: 18/833,813

(22) PCT Filed: Jan. 10, 2023

(86) PCT No.: PCT/KR2023/000416
§ 371 (c)(1),
(2) Date: Jul. 26, 2024

(87) PCT Pub. No.: WO2023/146162
PCT Pub. Date: Aug. 3, 2023

(65) Prior Publication Data
US 2025/0112352 A1 Apr. 3, 2025

(30) Foreign Application Priority Data
Jan. 27, 2022 (KR) ........................ 10-2022-0012367

(51) Int. Cl.
*H01R 12/71* (2011.01)
*H01Q 1/00* (2006.01)
(Continued)

(52) U.S. Cl.
CPC .......... *H01R 12/714* (2013.01); *H01Q 1/005* (2013.01); *H01R 12/7076* (2013.01);
(Continued)

(58) Field of Classification Search
CPC .......... H01Q 1/005; H01Q 1/20; H01Q 1/32; H01Q 1/50; H01R 12/7076; H01R 12/71;
(Continued)

(56) References Cited

U.S. PATENT DOCUMENTS 6,247,938 B1 6/2001 Rathburn
8,482,468 B2 7/2013 Park
(Continued)

FOREIGN PATENT DOCUMENTS

KR 10-2009-0120261 A 11/2009
KR 10-1049545 B1 7/2011
(Continued)

OTHER PUBLICATIONS

Extended European Search Report dated Apr. 3, 2025 as received in Application No. 23747205.5.
(Continued)

*Primary Examiner* — Robert Karacsony
(74) *Attorney, Agent, or Firm* — Maschoff Brennan

(57) ABSTRACT

The present disclosure is a technique for improving the stability and reliability of an antenna operation against external shock and vibration, and proposes an electrical member contact device including a gasket and a frame each having conductivity and configured so that the frame fastened to a fastening hole is bent to face the fastening hole and is coupled to the gasket, and an antenna module comprising same.

11 Claims, 7 Drawing Sheets

1

(51) Int. Cl.
*H01R 12/70* (2011.01)
*H01R 13/24* (2006.01)

(52) U.S. Cl.
CPC ..... *H01R 13/2414* (2013.01); *H01R 13/2435* (2013.01); *H01R 2201/02* (2013.01)

(58) Field of Classification Search
CPC .... H01R 12/712; H01R 12/714; H01R 13/22; H01R 13/24; H01R 13/2407; H01R 13/2414; H01R 13/2428; H01R 13/2435; H01R 13/2478; H01R 13/40; H01R 13/405; H01R 13/41; H01R 13/415; H01R 31/00; H01R 2201/02; H05K 9/0015; H05K 9/0016
See application file for complete search history.

(56) References Cited

U.S. PATENT DOCUMENTS

| | | | | |
|---|---|---|---|---|
| 11,191,196 | B2 | 11/2021 | Kim et al. | |
| 2012/0090885 | A1* | 4/2012 | Park | H05K 9/0015 174/358 |
| 2016/0315378 | A1 | 10/2016 | Kiriyama et al. | |
| 2020/0076056 | A1 | 3/2020 | Froese et al. | |
| 2020/0396872 | A1* | 12/2020 | Kim | H05K 9/0084 |
| 2022/0399633 | A1* | 12/2022 | Lee | H01R 13/115 |

FOREIGN PATENT DOCUMENTS

| | | | |
|---|---|---|---|
| KR | 20-0458069 | Y1 | 1/2012 |
| KR | 10-2012-0023952 | A | 3/2012 |
| KR | 10-2020-0142453 | A | 12/2020 |

OTHER PUBLICATIONS

KR Office Action dated Jan. 12, 2024 as received in Application No. 10-2022-0012367.
KR Decision to Grant Dated Apr. 1, 2024 as received in Application No. 10-2022-0012367.

* cited by examiner

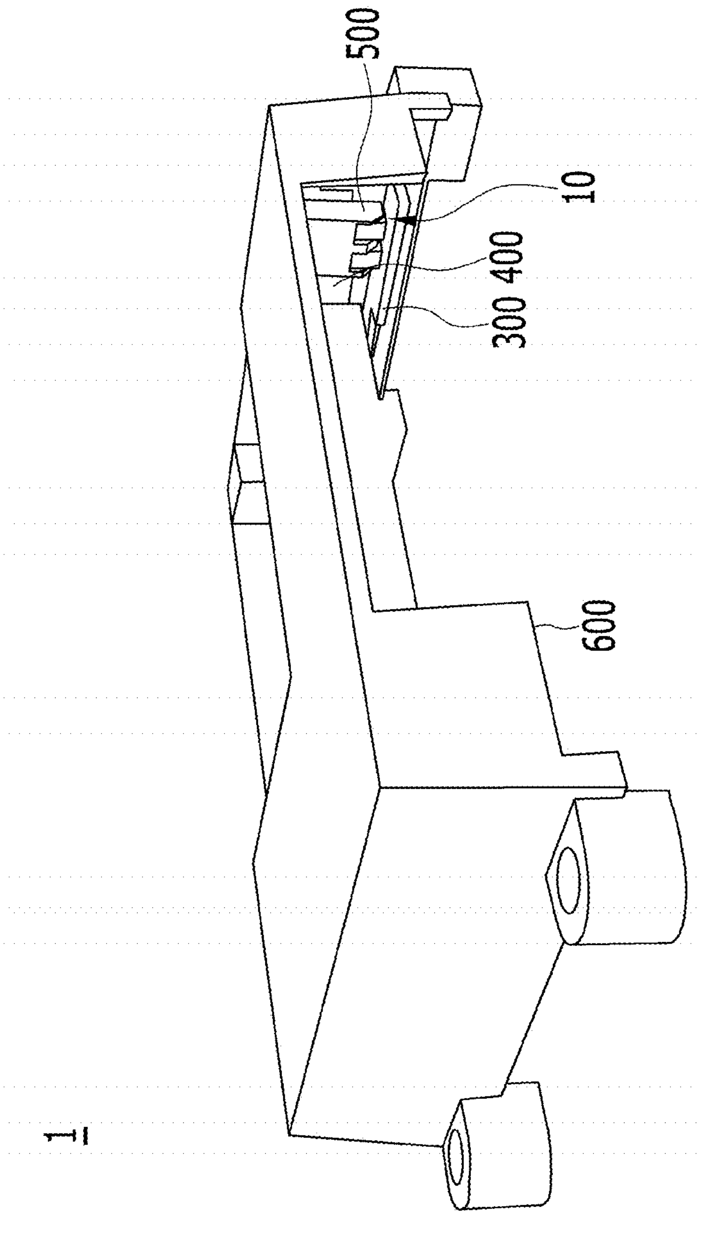
[FIG. 1]

[FIG. 2]
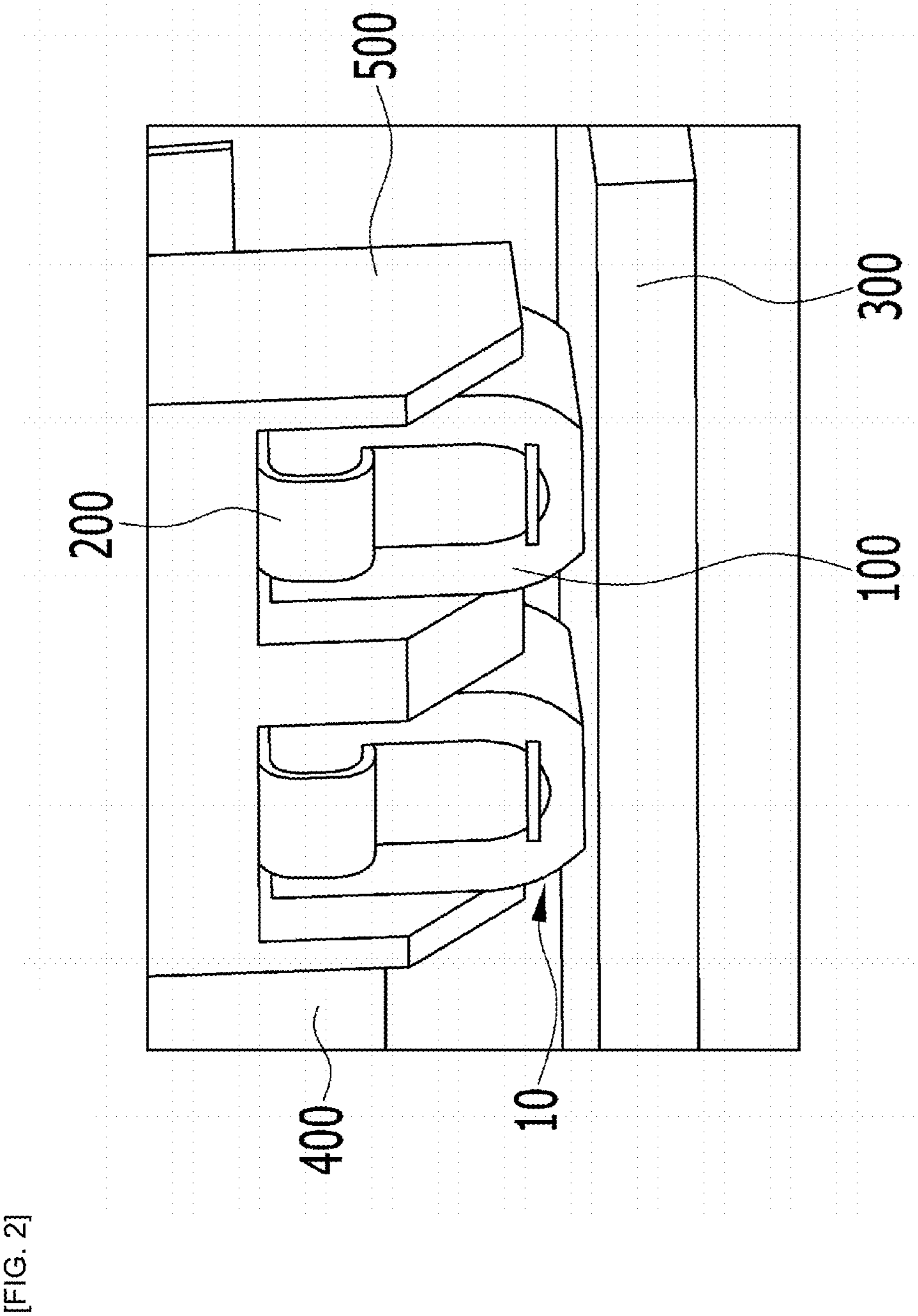

[FIG. 3]
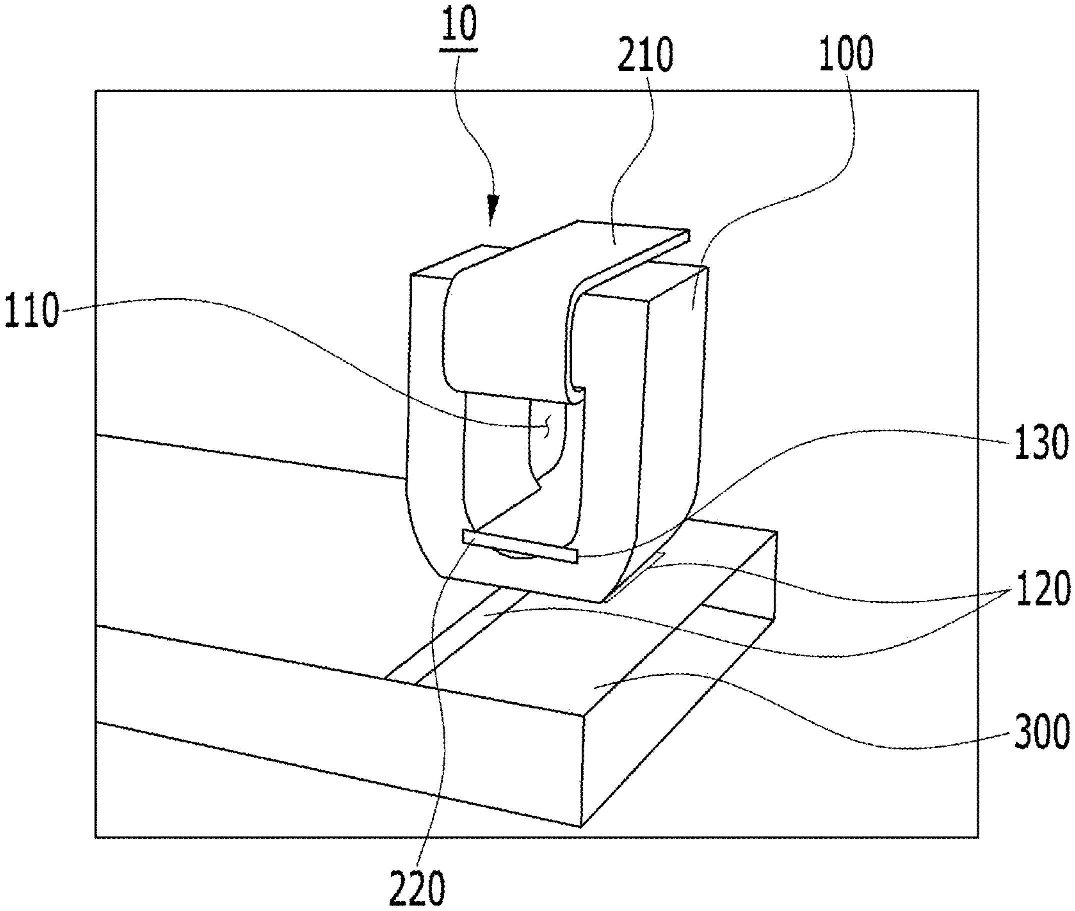

[FIG. 4]
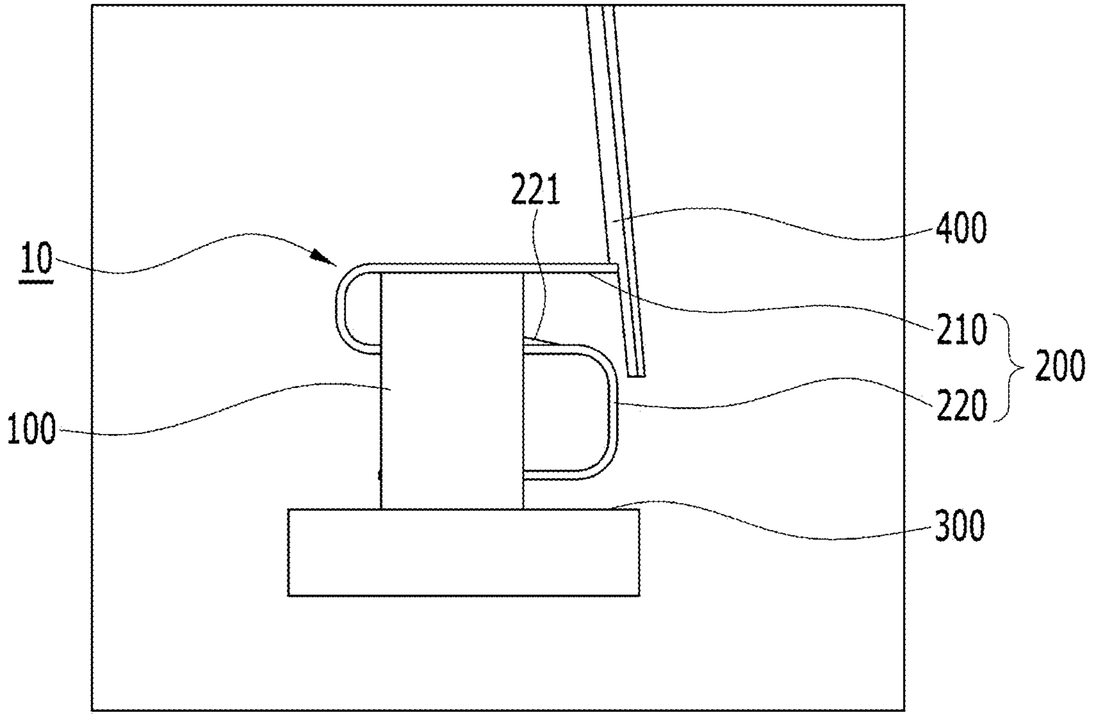

[FIG. 5]
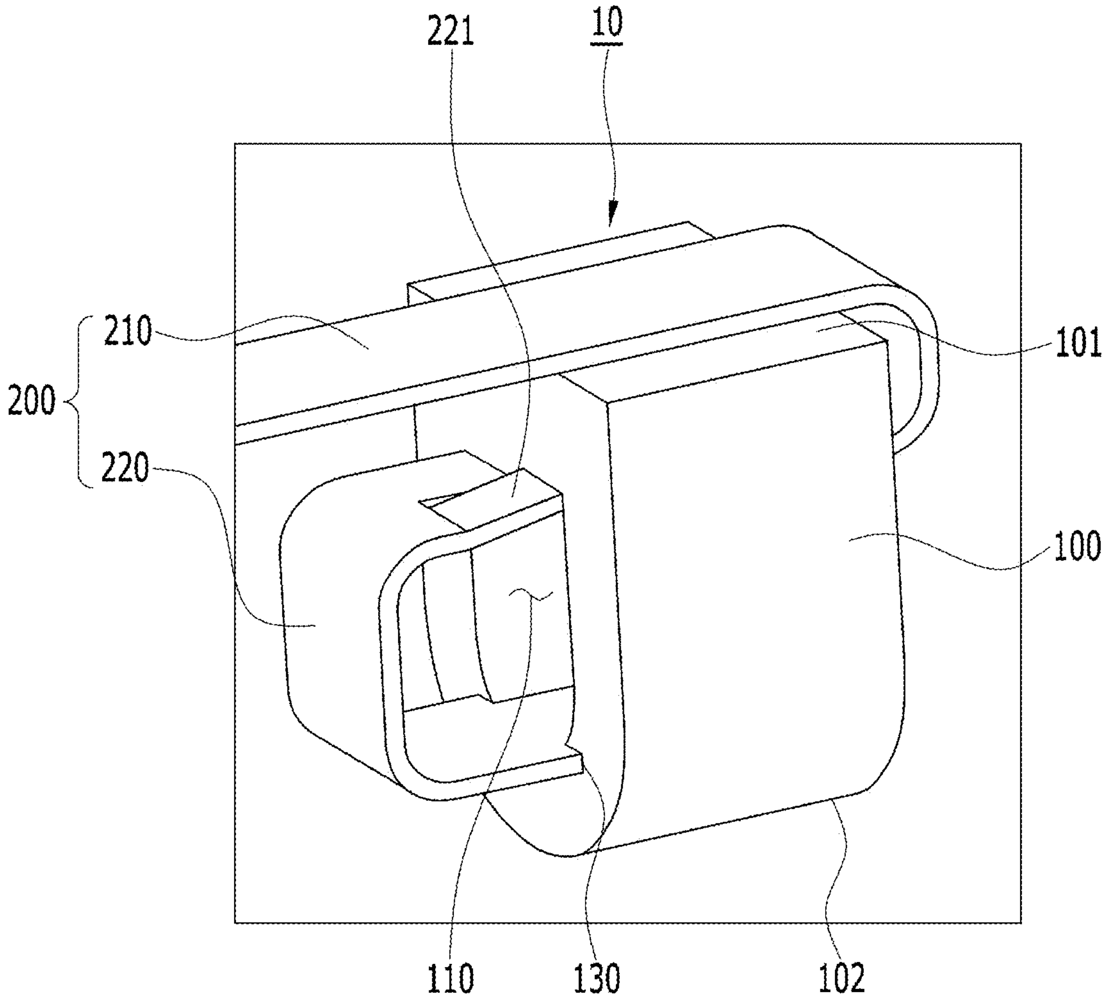

[FIG. 6]
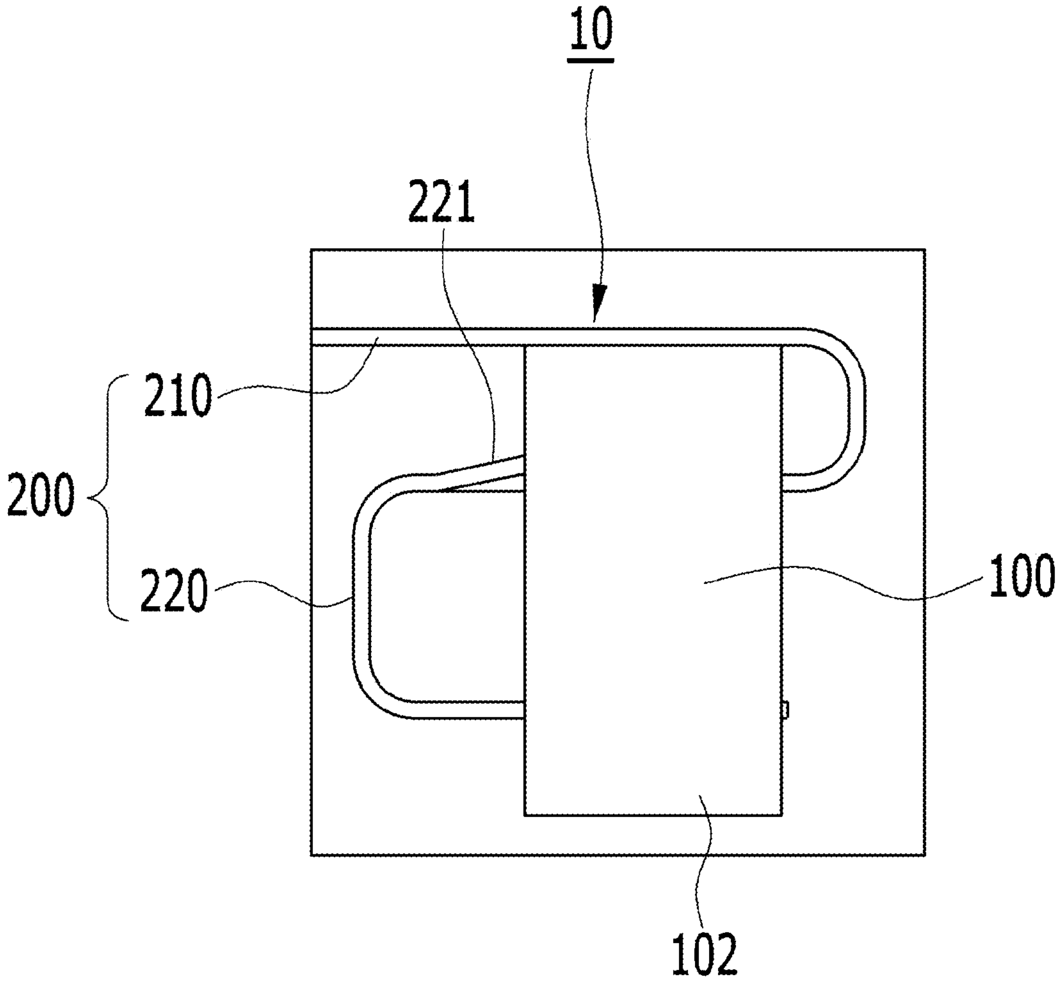

[FIG. 7]
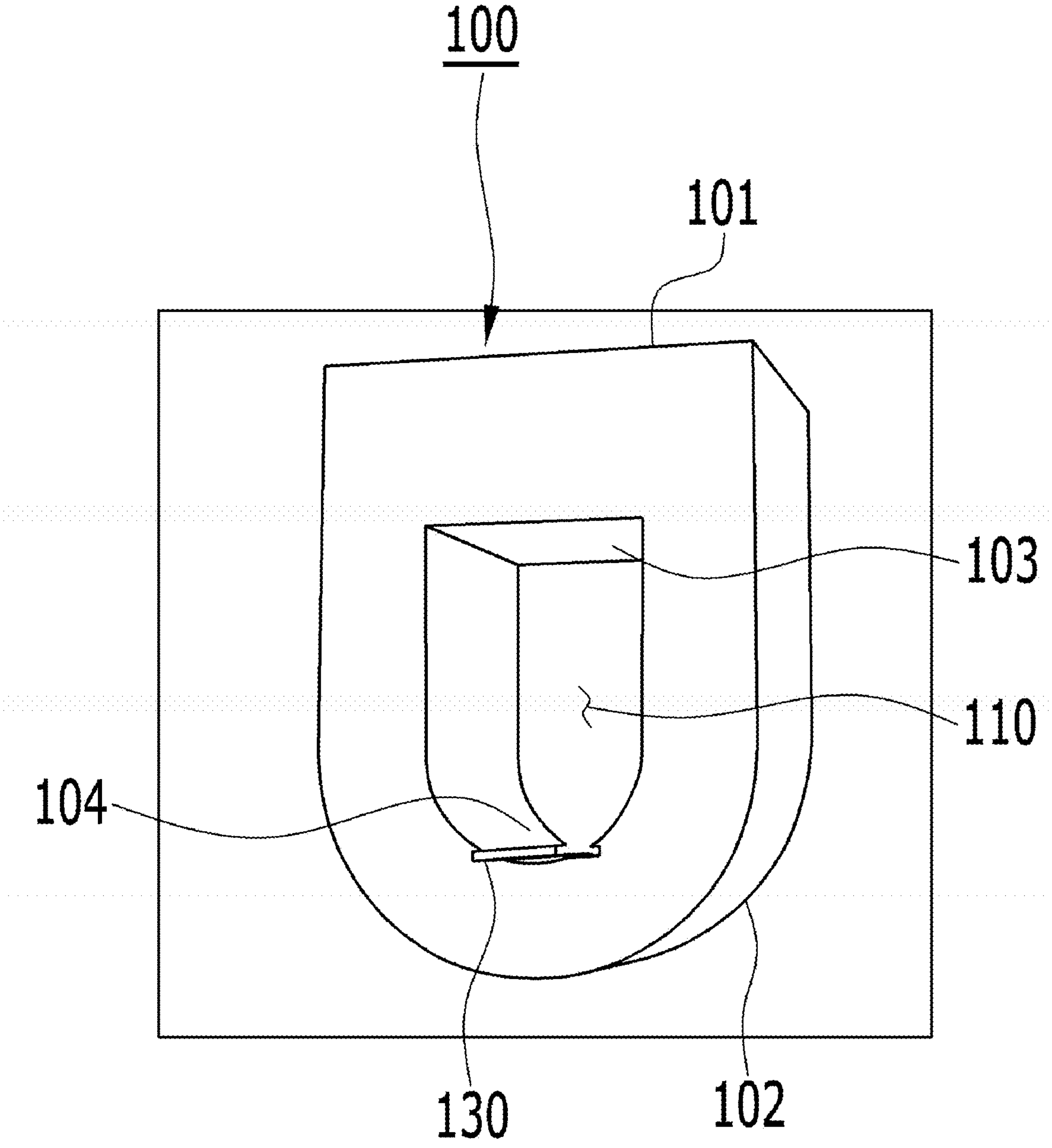

ELECTRICAL MEMBER CONTACT DEVICE AND ANTENNA MODULE COMPRISING SAME

TECHNICAL FIELD

Embodiments of the present disclosure relate to an electrical member contact device and an antenna module comprising same, and more particularly, to an electrical member contact device that protects the contact stability of a contact point between an antenna contact device and a substrate from external environmental factors such as vibration by improving the shape of a contact part, and an antenna module comprising same.

BACKGROUND ART

In general, vehicle antennas refer to various types of antennas mounted inside/outside of a vehicle for communication between wireless communication devices used in the vehicle. Recently, as wireless communication devices used in a vehicle such as AM/FM radios, digital multimedia broadcast (DMB) receivers, global positioning systems (GPS), and vehicle mobile communication devices are extensively used and diversified, there are rapidly increasing requests for vehicle antenna manufacturing techniques of supporting multiple frequency bands while improving durability against vibration and shock occurring in vehicle environments and ensuring the stability and reliability of an antenna operation.

However, since the related arts simply connect a radiator pattern to a feeding point on a feeding circuit board by soldering, there is a problem in that the durability of the feeding structure is reduced such as occurrence of cracks and contact failure on a soldered portion due to continuous vibration, external shock, or the like occurring in vehicle environments. In addition, when a gap occurs between a three-dimensional structure and a lower board due to vehicle vibration, shock, or the like, there is a problem in that the feeding structure is damaged to cause disconnection and the stability and reliability of an antenna operation are reduced.

In order to solve such problems, the related arts have adopted a feeding method using the restoring force of a part of an antenna radiator. However, there is a problem that the restoring force is reduced due to long-term use. In addition, since a feeding area is in the form of a contact point, there is a problem in that contact resistance increases due to environmental factors such as external shock or vibration.

The contents described in the Background Art are to help the understanding of the background of the disclosure, and may include contents that are not a disclosed conventional technology.

DISCLOSURE

Technical Problem

An object of the present disclosure is to provide an electrical member contact device capable of improving the stability and reliability of an antenna operation despite of external shock and vibration by improving a feeding structure of an antenna, and an antenna module comprising same.

An object of the present disclosure is to provide an electrical member contact device capable of providing measures for preventing an antenna radiator from being separated from a gasket when the restoring force of the antenna radiator is reduced due to long-term used, and an antenna module comprising same.

An object of the present disclosure is to provide an electrical member contact device capable of reducing the manufacturing cost by omitting an SMT process in a manufacturing process, and an antenna module comprising same.

Problems to be solved by the present disclosure are not limited to the aforementioned problems, and the other unmentioned problems will be clearly understood by those skilled in the art from the following description.

Technical Solution

An electrical member contact device according to embodiments of the present disclosure may include: a gasket comprising a fastening hole formed therethrough and having conductivity; and a frame fastened to the fastening hole of the gasket and having conductivity, wherein the frame may be curved past a first surface being an upper part of the gasket, may be formed to face the fastening hole, and may be coupled to the gasket.

The frame may be curved past the first surface being the upper part of the gasket, may protrude out of the fastening hole by penetrating the fastening hole, and may be curved again so that an end of the frame is fixed to the gasket.

The frame may be formed in an 'S' shape.

The frame may be made of an elastic material.

The gasket may be made of an elastic material.

The gasket may include a fitting guide part provided in a direction penetrating the fastening hole so that the end of the frame is fixed by fitting into the gasket.

The frame may include a protrusion formed to protrude into contact with a side surface of the gasket in order to fix the frame.

The gasket may include a second surface located facing the first surface and provided to be electrically conductive in contact with a substrate.

The fastening hole may include: a third surface formed on an inner surface of the fastening hole and adjacent to the first surface; and a fourth surface formed on the inner surface of the fastening hole, facing the third surface, and adjacent to the second surface.

The frame may include: a contact part formed in a 'C' shape while surrounding the first surface and the third surface; and a support part electrically connected to the contact part, arranged between the third surface and the fourth surface, and formed in a 'C' shape to form a curve protruding out of the fastening hole, an end of the support part being fixed to the gasket.

The contact part may be connected to the support part in a region where the third surface is arranged.

An antenna module including an electrical member contact device according to embodiments of the present disclosure may include: a gasket including a fastening hole formed therethrough and having conductivity; a substrate configured to contact the gasket; a frame fastened to the gasket, and having one end connected to a radiator and the other end connected to the gasket, the one end facing the other end; a fixing part to which the gasket is fixed; and a carrier configured to accommodate the gasket, the substrate, the frame, and the radiator therein, wherein the frame may be curved past a first surface being an upper part of the gasket, may be formed to face the fastening hole, and may be coupled to the gasket.

The frame may be curved past the first surface being the upper part of the gasket, may protrude out of the fastening hole by penetrating the fastening hole, and may be curved again so that an end of the frame is fixed to the gasket.

The frame may be made of an elastic material.

The gasket may be made of an elastic material.

The gasket may include a fitting guide part provided in a direction penetrating the fastening hole so that the end of the frame is fixed by fitting into the gasket.

The frame may include a protrusion formed to protrude into contact with a side surface of the gasket in order to fix the frame.

The gasket may include a second surface located facing the first surface and provided to be electrically conductive in contact with a substrate, and the fastening hole may include: a third surface formed on an inner surface of the fastening hole and adjacent to the first surface; and a fourth surface formed on the inner surface of the fastening hole, facing the third surface, and adjacent to the second surface.

The frame may include: a contact part formed in a ‘C’ shape while surrounding the first surface and the third surface; and a support part electrically connected to the contact part, arranged between the third surface and the fourth surface, and formed in a ‘C’ shape to form a curve protruding out of the fastening hole, an end of the support part being fixed to the gasket.

Advantageous Effects

According to the present disclosure, the following effects can be obtained.

First, in order to electrically connect a gasket to a substrate, a second surface of the gasket comes into contact with the substrate. In such a case, since surface contact is made rather than point contact, a contact area between the substrate and the gasket can be expanded, and separate components such as a feeding pad between the substrate and the gasket are not required.

Accordingly, an electrical connection between a frame fastened to the gasket and the substrate can be stably maintained against external shock or vibration, and since a separate feeding pad is not required for the electrical connection between the substrate and the gasket, a manufacturing process such as an SMT process is omitted, so that the manufacturing cost can be reduced.

In addition, a protrusion provided on a support part of the frame protrudes from the frame to contact the side surface of the gasket.

Accordingly, even though the restoring force of the frame made of an elastic material is reduced with long-term use, it is possible to prevent the support part of the frame from being separated from the gasket due to the protrusion.

In addition, the gasket is provided with a fitting guide part and is configured so that the support part is fitted adjacent to a fourth surface of the gasket.

Therefore, even when external shock occurs, the support part of the frame is not separated from the gasket, so that the stability of an antenna operation can be maintained.

Effects of the present disclosure are not limited to the aforementioned effects and other unmentioned effects will be clearly understood by those skilled in the art from the following description.

DESCRIPTION OF DRAWINGS

FIG. 1 is a perspective view of an antenna module including an electrical member contact device according to an embodiment of the present disclosure.

FIG. 2 is an enlarged view related to the electrical member contact device in FIG. 1 according to an embodiment of the present disclosure.

FIG. 3 is a view illustrating coupling between the electrical member contact device according to an embodiment of the present disclosure and a substrate.

FIG. 4 is a side view of FIG. 3.

FIG. 5 is a perspective view of a gasket of the present disclosure.

FIG. 6 is a perspective view of the electrical member contact device according to an embodiment of the present disclosure when viewed in another direction.

FIG. 7 is a side conceptual view of an operation of a frame in FIG. 6.

MODE FOR INVENTION

The advantages and characteristics of the present disclosure and a method for achieving the advantages and characteristics will be clearly understood through embodiments to be described in detail with reference to the accompanying drawings. However, the present disclosure is not limited to the following embodiments, but may be implemented in various forms different from each other, and the present embodiment is provided to bring the disclosure of the present disclosure to perfection and assist those skilled in the art to completely understand the scope of the present disclosure. Therefore, the scope of the present disclosure is defined only by claims.

Terms used in the present specification are used to describe a specific embodiment, and are not intended to limit the present disclosure. Furthermore, in the present specification, an expression of the singular number may include an expression of the plural number unless clearly defined otherwise in the context.

The meaning of ‘comprise’ and ‘comprising’ used in the specification does not exclude the presence or addition of one or more other components in addition to the mentioned components.

Term “and/or” used in the present specification includes each of mentioned components and one or more combinations thereof. Although terms “first” and “second” are used to describe various components, the components are not limited by the terms. The terms are used only to distinguish one component from another component. Therefore, a first component described below may be a second component within the technical idea of the present disclosure.

Term “horizontal direction” used in the following description means a front, rear, left or right direction with no change in the position in an upward or downward direction, and term “vertical direction” used in the following description means an upward or downward direction with no change in the position in the front, rear, left or right direction.

The drawings are merely for enabling the spirit of the present disclosure to be understood, and it should not be interpreted that the scope of the present disclosure is limited by the drawings. Furthermore, in the drawings, a relative thickness or length or a relative size may be enlarged for convenience and the clarity of description, and the same reference numerals refer to the same components throughout the specification.

Hereinafter, embodiments of the present disclosure are described in detail with reference to the accompanying drawings.

FIG. 1 is a perspective view of an antenna module 1 including an electrical member contact device according to embodiments of the present disclosure.

Referring to FIG. 1, the antenna module 1 according to embodiments of the present disclosure includes an electrical member contact device 10, a substrate 300, a radiator 400, a fixing part 500, and a carrier 600.

The carrier 600 has a dome shape with an open bottom and an empty interior. The electrical member contact device 10, the substrate 300, and the radiator 400 are accommodated inside the carrier 600. Depending on the antenna operation characteristics desired by a user, a plurality of electrical member contact devices 10, a plurality of substrates 300, and a plurality of radiators 400 may be provided.

The carrier 600 may be made of an insulating material by injection molding. The carrier 600 may be made of a synthetic resin material in order to maintain weather resistance, impact resistance, and mechanical strength.

Although not illustrated in the drawing, the carrier 600 may be mounted on a vehicle or on main boards of various devices.

The electrical member contact device 10 is configured to be electrically connected to the substrate 300 and the radiator 400, and is fitted into the fixing part 500 as illustrated in the drawing.

The substrate 300 is mounted on an inner surface of the carrier 600. A feeding pattern 120 is formed on the substrate 300, and the feeding pattern 120 of various service bands such as DMB signals, FM/AM signals, GPS signals, and CDMA signals is formed.

The feeding pattern 120 may be formed at a contact point of the gasket 100 and the substrate 300 and be electrically connected to the gasket 100.

The feeding pattern 120 is coupled to an internal RF processing circuit of a vehicle provided with the antenna module 1, and receives RF signals received from the radiator 400.

The radiator 400 is located above the electrical member contact device 10 and is electrically coupled to the electrical member contact device 10. The radiator 400 is fixed to one inner surface of the carrier 600 and may have a conductive pattern.

The radiator 400 is configured to be supplied with power by the substrate and radiate an electronic signal into space, and transmits and receives signals in a predetermined frequency band. For example, the radiator 400 may have a function of receiving DMB signals and FM/AM signals.

The length and width of the radiator 400 are set to be appropriate for receiving FM/AM signals in a low frequency band compared to DMB.

The shape of the radiator 400 is preferably a plate shape as illustrated in the drawing, but is not necessarily limited to the plate shape.

The fixing part 500 is fixed by coupling the electrical member contact device 10, and further explanation thereof is described below with reference to FIG. 2.

The carrier 600 may adjust the arrangement structure the substrate 300 and the radiator 400 and the number thereof to be arranged, so that the antenna module 1 exhibits desired radiation characteristics.

The carrier 600 may play a role in reducing a specific absorption rate (SAR).

The carrier 600 is provided with a recessed area, and the recessed area may include various components in addition to an antenna module necessary for the operation of an antenna. The antenna module refers to an antenna module that transmits or receives a frequency signal.

FIG. 2 is an enlarged view of the electrical member contact device 10 in FIG. 1 according to an embodiment of the present disclosure.

Referring to FIG. 2, the electrical member contact device 10 is vertically installed on the substrate 300. The gasket 100 provided in the electrical member contact device 10 forms a pressing surface on the substrate 300 and is in contact with the substrate 300.

The frame 200 provided in the electrical member contact device 10 serves as a medium for electrical connection between the radiator 400 and the substrate 300.

In such a case, the electrical member contact device 10 is coupled to the fixing part 500 fixedly arranged inside the carrier. The position of the electrical member contact device 10 may be fixed to the fixing part 500 by insertion or fitting.

Therefore, even though external shock is applied to the antenna module 1, since the gasket 100 and the substrate 300 are less likely to separate from each other, the gasket 100 and the substrate 300 can more stably maintain their coupling than before.

On the other hand, a plurality of electrical member contact devices 10 may be arranged on the substrate 300 depending on the antenna operation characteristics.

FIG. 3 is a view illustrating coupling between the electrical member contact device 10 according to an embodiment of the present disclosure and the substrate 300, FIG. 4 is a side view of FIG. 3, and FIG. 5 is a perspective view of the gasket 100 of the present disclosure.

Referring to FIGS. 3 to 5, the electrical member contact device 10 includes the gasket 100 and the frame 200.

The gasket 100 is provided in a rectangular parallelepiped shape, has an arched lower portion to form the outer shape of the electrical member contact device 10, and is made of a conductive material.

The gasket 100 has a first surface 101, a second surface 102, a third surface 113, a fourth surface 114, and a fastening hole 110 formed therethrough.

The first surface 101 constitutes the outer surface of the gasket 100, is located at the top of the gasket 100, and has a flat cross-section.

The second surface 102 constitutes the outer surface of the gasket 100 and is formed at a position opposite to the first surface 101.

The second surface 102 is provided so that the lower portion of the gasket 100 is arched before the gasket 100 is installed on (contacts) the substrate 300.

In the process of installing the gasket 100 on the substrate 300, the arch structure of the second surface 102 is pressed and comes into surface contact with the substrate 300.

The gasket 100 may be made of an elastic material. Accordingly, when the gasket 100 is brought into contact with the substrate 300 for electrical connection, since the second surface 102 is deformed by elasticity while contacting the substrate 300, the gasket 100 and the substrate 300 may be brought into surface contact with each other.

The fastening hole 110 is formed through the gasket 100 and is configured to be coupled to a support part 220 of the frame 200 to be described below.

The third surface 113 and the fourth surface 114 form the inner surface of the fastening hole 110. The third surface 113 is located adjacent to the first surface 101 and may be formed to be flat. The fourth surface 114 faces the third surface 113 and is formed adjacent to the second surface 102.

The gasket 100 is electrically connected to the substrate 300. In such a case, the second surface 102 of the gasket 100 may be electrically connected by partially contacting the substrate 300 as described above.

When the gasket 100 is brought into surface contact with the substrate 300 and is electrically connected thereto, since the contact area is larger than in the case of the related art in which the gasket 100 and the substrate 300 are in point contact with each other, the antenna operation may be more stable even though external shock or vibration is applied to the embodiment of the present disclosure.

When the electrical member contact device 10 according to an embodiment of the present disclosure is installed on the substrate 300, no feeding pad is required unlike the related art. Since the second surface 102 having the arcuate structure and formed on the gasket 100 is pressed and makes surface contact while being mounted on the substrate 300, electrical connection can be made without a feeding pad. When a feeding pad is provided in order to electrically connect the substrate 300 and the gasket 100, a surface mounter technology (SMT) process needs be performed in order to mount the electrical member contact device 10 on the surface of the substrate 300 during the manufacturing process, thereby increasing the manufacturing cost. However, since the SMT process can be omitted in the present disclosure, the manufacturing cost of the present disclosure can be reduced.

The frame 200 is made of the same material as the radiator 400. The frame 200 has conductivity. In addition, the frame 200 may be made of an elastic material.

The frame 200 is curved past the first surface 101 being an upper part of the gasket 100, is formed to face the fastening hole 110, and is coupled to the gasket 100.

In addition, the frame 200 is curved past the first surface 101 being the upper part of the gasket 100, and protrudes out of the fastening hole 110 by penetrating the fastening hole 110, and the protruding gasket 100 is curved again and its end is fixed to the gasket 100. In such a case, the frame 200 may be formed in an 'S' shape when viewed from the side.

Specifically, the frame 200 includes a contact part 210 and the support part 220.

The contact part 210 is formed to surround the first surface 101 and the third surface 113. When viewed from the side, the contact part 210 may be formed in a 'C' shape.

When the electrical member contact device 10 being an embodiment of the present disclosure is used in the antenna module, the contact part 210 is in contact with the first surface 101 of the gasket 100 as illustrated in FIG. 2. The portion of the contact part 210 that is in contact with the first surface 101 is formed to be flat like the first surface 101 and is in close contact with the first surface 101, thereby forming a large contact area.

In such a case, the contact part 210 contacts the third surface 113. The portion of the contact part 210 that is in contact with the third surface 113 is formed to be flat like the third surface 113 and is in close contact with the third surface 113. Therefore, the contact area between the contact part 210 of the frame 200 and the third surface 113 may be formed to be large.

That is, the contact part 210 formed in a 'C' shape may be inserted into the gasket 100 while surrounding the first surface 101 and the third surface 113.

The contact part 210 may be electrically connected to the radiator 400 fixed to the carrier 600.

The support part 220 is electrically connected to the contact part 210 and supports the inner surface of the fastening hole 110.

The support part 220 is electrically connected to the contact part 210, is arranged between the third surface 113 and the fourth surface 114 of the fastening hole 110, and is curved to protrude out of the fastening hole 110. When viewed from the side, the support part 220 is formed in a 'C' shape.

The frame 200 includes a protrusion 221.

The protrusion 221 is formed to protrude into contact with the side surface of the gasket 100 in order to fix the frame 200. A more detailed description of the protrusion 221 is provided below.

The support part 220, which is formed by being curved, exerts a supporting force or an elastic force toward the third surface 113 and the fourth surface 114. Accordingly, even though the support part 220 is inserted into the fastening hole 110 of the gasket 100, the support part 220 may not be easily separated from the gasket 100 due to the supporting force or the elastic force.

The frame 200 may be configured in an 'S' shape by electrically connecting and coupling the contact part 210 having a 'C' shape and the support part 220 having a 'C' shape described above.

The gasket 100 includes a fitting guide part 130 provided in the direction penetrating the fastening hole 110 so that the end of the frame 200 is fixed by fitting into the gasket 100.

Specifically, the fitting guide part 130 is formed on the inner surface of the fastening hole 110. The fitting guide part 130 is located adjacent to the fourth surface 114 of the fastening hole 110, and is formed on both sides of the inner surface of the fastening hole 110 in correspondence with the shape of the support part 220 so that the support part 220 is fitted.

Since the support part 220 is coupled to the fitting guide part 130, the support part 220 may not be easily separated from the gasket 100 even though external shock or the like is applied to the embodiment of the present disclosure. Therefore, the stability of the antenna operation can be maintained.

FIG. 6 is a perspective view of the electrical member contact device 10 according to an embodiment of the present disclosure when viewed in another direction, and FIG. 7 is a side conceptual view of the operation of the frame 200 in FIG. 6.

Referring to FIGS. 6 and 7, the support part 220 includes the protrusion 221.

The protrusion 221 protrudes from the support part 220 and contacts the side surface of the gasket 100. Therefore, the protrusion 221 can prevent the support part 220 from being separated from the gasket 100.

According to the illustrated embodiment, the protrusion 221 may be formed by cutting a portion of the support part 220 adjacent to the third surface 113 of the fastening hole 110 in the longitudinal direction and lifting the cut portion toward the first surface 101.

When the contact part 210 having a 'C' shape is inserted into the gasket 100, the protrusion 221 is formed in a direction opposite to the curved shape of the contact part 210. That is, the protrusion 221 is formed in a direction opposite to the position where the contact part 210 surrounds the first surface 101 and the third surface 113.

When an embodiment of the present disclosure is used for a long period of time, since the restoring force of the frame 200 made of an elastic material is reduced or the rigidity of the frame 200 is weakened, the frame 200 and the gasket 100 may not be closely coupled and a gap may be formed therebetween. When the gap is formed in this way, since the electrical connection between the frame 200 and the gasket 100 is unstable, there is a problem in that the antenna operation is unstable. The above-mentioned protrusion 221 can prevent the support part 220 of the frame from being separated from the gasket 100.

That is, since the frame 200 is formed in an 'S' shape by connecting the contact part 210 and the support part 220 and is fastened to the gasket 100, it is difficult for the frame 200 to be separated from the gasket 100. In addition, the frame 200 has a structure in which the contact part 210 is fitted in close contact with the gasket 100 while contacting the first surface 101 of the gasket 100 and the inner surface of the fastening hole 110. Moreover, the support part 220 is provided with the protrusion 221 that contacts the side of the gasket 100, and the gasket 100 is provided with the fitting guide part 130 so that the support part 220 is fitted and coupled to the gasket 100. Accordingly, it can be seen that a plurality of means are provided to prevent the frame 200 connected to the radiator 400 from being separated from the gasket 100.

The embodiment of the present disclosure also has the effect of being able to be manufactured at low cost than before even though a plurality of methods are provided to prevent the frame 200 connected to the radiator 400 from being separated from the gasket 100.

When the electrical member contact device 10 being an embodiment of the present disclosure is fixed to the fixing part 500 of the antenna module and connected to the substrate 300 and the radiator 400, the contact part 210 of the frame 200 is in contact with the gasket 100, but a gap may be formed between the gasket 100 and the frame 200 before the electrical member contact device 10 is installed in the antenna module.

Since the frame 200 is made of an elastic material, when pressure is applied from above the frame 200 toward the frame 200, the gasket 100 and the frame 200 can be brought into close contact without a gap.

When pressure is applied from above the frame 200 toward the frame 200, since the frame 200 is made of an elastic material, a gap may be formed between the frame 200 and the third surface 113. Even though a gap is formed between the frame 200 and the third surface 113 in this way, the frame 200 is provided with the protrusion 221 as described above, thereby preventing the frame 200 from being separated from the gasket 100.

The above description is merely a description of the technical spirit of the present disclosure, and those skilled in the art may change and modify the present disclosure in various ways without departing from the essential characteristic of the present disclosure. Accordingly, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all of technical spirits within an equivalent range of the present disclosure should be construed as being included in the scope of rights of the present disclosure.

The invention claimed is:

1. An electrical member contact device comprising:
- a gasket comprising a fastening hole formed therethrough and having conductivity; and
- a frame fastened to the fastening hole of the gasket and having conductivity,
- wherein the frame is curved past a first surface being an upper part of the gasket, is formed to face the fastening hole, and is coupled to the gasket,
- wherein the frame is formed in an 'S' shape,
- wherein the gasket comprises a second surface located facing the first surface and provided to be electrically conductive in contact with a substrate,
- wherein the fastening hole comprises:
- a third surface formed on an inner surface of the fastening hole and adjacent to the first surface; and
- a fourth surface formed on the inner surface of the fastening hole, facing the third surface, and adjacent to the second surface,
- wherein the frame comprises:
- a contact part formed in a 'C' shape while surrounding the first surface and the third surface; and
- a support part electrically connected to the contact part, arranged between the third surface and the fourth surface, and formed in a 'C' shape to form a curve protruding out of the fastening hole, an end of the support part being fixed to the gasket,
- wherein the contact part is connected to the support part in a region where the third surface is arranged.

2. The electrical member contact device of claim 1, wherein the frame is curved past the first surface being the upper part of the gasket, protrudes out of the fastening hole by penetrating the fastening hole, and is curved again so that an end of the frame is fixed to the gasket.

3. The electrical member contact device of claim 1, wherein the frame is made of an elastic material.

4. The electrical member contact device of claim 1, wherein the gasket is made of an elastic material.

5. The electrical member contact device of claim 2, wherein the gasket comprises a fitting guide part provided in a direction penetrating the fastening hole so that the end of the frame is fixed by fitting into the gasket.

6. The electrical member contact device of claim 2, wherein the frame comprises a protrusion formed to protrude into contact with a side surface of the gasket in order to fix the frame.

7. An antenna module comprising an electrical member contact device, comprising:
- a gasket comprising a fastening hole formed therethrough and having conductivity;
- a substrate configured to contact the gasket;
- a frame fastened to the gasket, and having one end connected to a radiator and the other end connected to the gasket; and
- a fixing part to which the gasket is fixed,
- wherein the frame is curved past a first surface being an upper part of the gasket, is formed to face the fastening hole, and is coupled to the gasket,
- wherein the frame is curved past the first surface being the upper part of the gasket, protrudes out of the fastening hole by penetrating the fastening hole, and is curved again so that an end of the frame is fixed to the gasket,
- wherein the gasket comprises a second surface located facing the first surface and provided to be electrically conductive in contact with a substrate, and
- the fastening hole comprises:
- a third surface formed on an inner surface of the fastening hole and adjacent to the first surface; and
- a fourth surface formed on the inner surface of the fastening hole, facing the third surface, and adjacent to the second surface,
- wherein the frame comprises:
- a contact part formed in a 'C' shape while surrounding the first surface and the third surface; and
- a support part electrically connected to the contact part, arranged between the third surface and the fourth surface, and formed in a 'C' shape to form a curve protruding out of the fastening hole, an end of the support part being fixed to the gasket.

8. The antenna module comprising an electrical member contact device of claim 7, wherein the frame is made of an elastic material.

9. The antenna module comprising an electrical member contact device of claim 7, wherein the gasket is made of an elastic material.

10. The antenna module comprising an electrical member contact device of claim 7, wherein the gasket comprises a fitting guide part provided in a direction penetrating the fastening hole so that the end of the frame is fixed by fitting into the gasket.

11. The antenna module comprising an electrical member contact device of claim 7, wherein the frame comprises a protrusion formed to protrude into contact with a side surface of the gasket in order to fix the frame.

* * * * *